Nov. 28, 1933.     H. T. SEELEY     1,937,497
CONTROL SYSTEM
Filed April 23, 1932
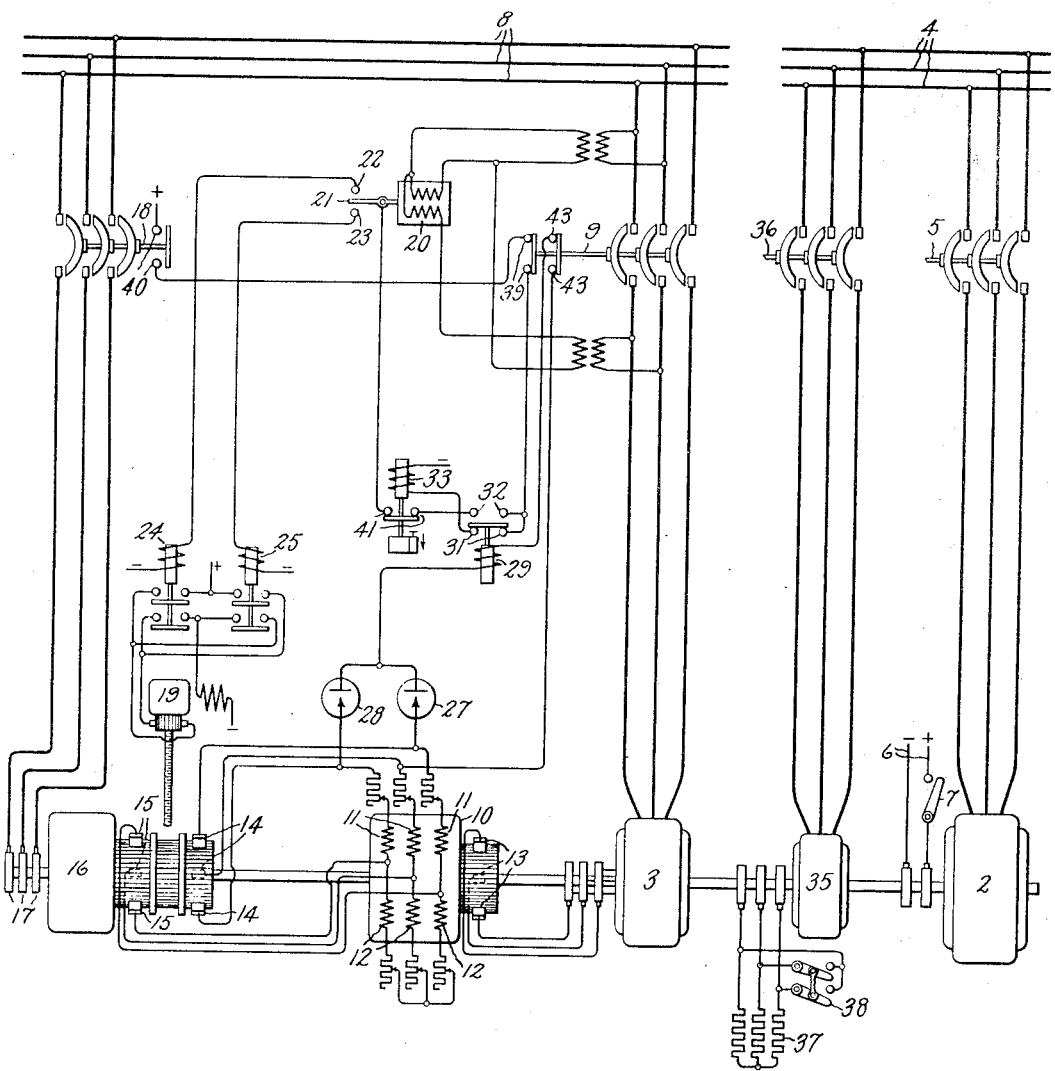
Inventor:
Harold T. Seeley,
by Charles *illegible*
His Attorney.

Patented Nov. 28, 1933

1,937,497

UNITED STATES PATENT OFFICE 1,937,497

CONTROL SYSTEM

Harold T. Seeley, Yeadon, Pa., assignor to General Electric Company, a corporation of New York Application April 23, 1932. Serial No. 607,203

7 Claims. (Cl. 172—281)

My invention relates to control systems and particularly to automatic control systems for asynchronous machines of the type which have a phase wound secondary winding supplied with current of slip frequency from a separate source and its object is to provide an improved control system of the type disclosed and claimed in the copending application of Harold T. Seeley and George S. Whitlow, Serial No. 607,202, filed Apr. 23, 1932, and assigned to the assignee of this application. In the above-mentioned copending application a control arrangement is disclosed for automatically controlling the slip frequency voltage applied to the secondary winding of an asynchronous machine in such a manner that the voltage is automatically adjusted for a predetermined time during each half cycle of the slip frequency voltage. In order to reduce the wear on the voltage regulating apparatus, I provide an improved arrangement whereby the slip frequency voltage is adjusted for a relatively long predetermined time once during each cycle of the slip frequency voltage instead of being adjusted twice during each cycle for a relatively short predetermined time as disclosed in the above-mentioned copending application.

My invention will be better understood from the following description when taken in connection with the accompanying drawing which diagrammatically illustrates a frequency converter control system embodying my invention and its scope will be pointed out in the appended claims.

In the drawing, 1 represents a frequency converter comprising a synchronous machine 2 and an asynchronous machine 3 which have their rotors mechanically connected together. The synchronous machine 2 has a primary winding which is arranged to be connected to an electric circuit 4 by a suitable switch 5. The synchronous machine 2 also has a field winding which is arranged to be connected to a suitable source of excitation 6 by a suitable switch 7. In order to simplify the disclosure, these switches 5 and 7 are shown as manually operated devices.

The asynchronous machine 3 has a primary winding which is arranged to be connected to another electric circuit 8 by means of a suitable switch 9. The asynchronous machine 3 also has a polyphase wound secondary winding which is connected to a suitable polyphase exciter 10 which is arranged to produce a polyphase voltage of slip frequency. As shown in the drawing, the exciter 10 is a dynamo-electric machine which has its rotor mechanically connected to the rotors of the machines 2 and 3. This machine is provided with two sets of field windings 11 and 12 and is also provided with an armature winding which is connected by means of brushes 13 to the secondary winding of the asynchronous machine 3. The field windings 11 and 12 are connected in a manner well known in the art to two three-phase sets of adjustable brushes 14 and 15 of an ohmic drop exciter 16, the slip rings 17 of which are arranged to be connected to the electric circuit 8 by means of a suitable switch 18. The rotor of the ohmic drop exciter 16 is mechanically connected to the rotors of the machines 2, 3 and 10. The brushes 14 and 15 of the ohmic drop exciter 16 are adjusted in a desired manner by means of a reversible motor 19. Since the detail construction of the brush operating means constitutes no part of my invention and such construction is well known in the art and an example of such construction is disclosed in United States Letters Patent 1,778,599, I have omitted all constructional details of the brush operating mechanism. As shown in the drawing, the machines 10 and 16 constitute one modification of the well known Scherbius control system for applying an adjustable voltage of slip frequency to the secondary winding of a dynamo-electric machine.

By operating the brush shifting motor 19 in the proper direction while the switch 9 is open, the primary voltage of the machine 3 may be brought into phase with the voltage of the circuit 8. As is well known in the art, the brush operating mechanism is also constructed so that when the primary voltage of the machine 3 and the voltage of the circuit 8 are in phase, their magnitudes are also substantially equal. In order that the brushes 14 and 15 may be automatically adjusted so as to bring the primary voltage of the machine 3 into phase with the voltage of the circuit 8, a relay 20 is provided which is connected to one phase of the primary winding of the machine 3 and to one phase of the circuit 8 so that the relay responds to a predetermined phase relation between these voltages. Preferably, the relay 20 is designed to operate in accordance with the sine of the angle between the voltages of the two corresponding phases so that when the primary voltage of the machine 3 leads the voltage of circuit 8, the relay 20 closes its contacts 21 and 22 to effect the completion of a circuit for the motor 19 so that the brushes 14 and 15 are shifted in a direction to bring the voltages into phase and when the primary voltage of the machine 3 lags the voltage of circuit 8, the relay 20 closes its contacts 21 and 23 to effect the completion of another circuit for the motor 19 so that the brushes are shifted in the opposite direction to bring the voltages into phase. As shown in the drawing, the contacts 21 and 22 control the circuit of a control relay 24 which, in turn, controls the circuits of the motor 19 so as to cause it to operate in one direction and the contacts 21 and 23 of the relay 20 control the circuit of a control relay 25 which, in turn, controls the circuits of the motor 19 so as to cause it to operate in the opposite direction.

In order to prevent overrunning of the brush operating motor, I provide in accordance with my invention an arrangement for permitting the relay 20 to effect the operation of the brush operating motor 19 only once during each cycle of the slip frequency voltage applied to the secondary winding of the machine 3. In the particular embodiment of my invention shown in the drawing this result is accomplished by connecting two half-wave rectifiers 27 and 28 in series across two of the brushes 14 of the ohmic drop exciter 16 in such a manner that current cannot flow between these brushes through this series connection and by connecting an instantaneous voltage responsive relay 29 between the other brush 14 of the ohmic drop exciter 16 and the common connection between the two rectifiers 27 and 28. With the relay 29 connected in the manner shown, it will be obvious to those skilled in the art that current flows through the relay 29 during 5/6 of each cycle of the slip frequency voltage applied to the secondary winding of the machine 3. By properly designing the relay 29 so that it operates only in response to a certain impressed voltage, it is possible to have this relay maintain its contacts 31 open and its contacts 32 closed during a portion of this period during which current flows through the winding of the relay 29. In the arrangement shown in the drawing, the relay 20 controls the circuits of the control relays 24 and 25 and also the operation of a suitable timing relay 33 so that it interrupts the circuit through the contacts of the relay 29 after they have been closed a predetermined time. Therefore, once during each cycle of the slip frequency voltage applied to the secondary winding of the machine 3 one of the control relays is energized for a predetermined time if the contact 21 of the relay 20 is in engagement with either of its cooperating contacts. Therefore, it will be seen that the rate at which the brushes of the ohmic drop exciter 16 are shifted varies directly with the slip frequency.

In the particular arrangement shown in the drawing a starting motor 35 is provided for starting the frequency converter 1 from rest and bringing it up to substantially synchronous speed. It is obvious, however, that the frequency converter may be started in any other suitable manner, examples of which are well known in the art. As shown a switch 36 is provided for connecting the primary winding of the starting motor 35 to the circuit 4 and a starting resistor 37 is provided in the secondary circuit of the starting motor. This starting resistor 37 is arranged to be short-circuited by a suitable switch 38.

In order to simplify the disclosure, the switches 9, 18, 36 and 38 are shown as manually controlled devices but it is obvious that they may be automatically controlled in any suitable manner, examples of which are well known in the art.

The operation of the arrangement shown in the drawing is as follows: When it is desired to start the frequency converter 1, the switch 36 is closed to connect the primary winding of the starting motor 35 to the circuit 4. After the motor 35 has reached a predetermined speed, the switch 38 is closed to short-circuit the starting resistor 37 in the secondary circuit of the motor. The switch 5 is then closed to connect the primary winding of the synchronous machine 2 to the circuit 4 after which the switch 7 is closed to synchronize the machine 2 and the switches 36 and 38 are opened. The switch 18 is then closed to connect the slip rings 17 of the ohmic drop exciter 16 to the circuit 8. The exciter 16 then operates in a manner well known in the art to apply voltage of slip frequency to the windings 11 and 12 of the alternating current exciter 10 so that a voltage of slip frequency is also applied to the secondary winding of the asynchronous machine 3. The voltage induced in the primary winding of the machine 3 and the voltage of the circuit 8, therefore, are of the same frequency.

During a portion of each cycle of the slip frequency voltage applied to the secondary winding of the machine 3 the instantaneous voltages impressed across the winding of the relay 29 are of such values that the relay maintains its contacts 31 open and its contacts 32 closed. For example, if the relay is designed so that its pick-up value is approximately 50% of the maximum instantaneous phase voltage of the ohmic exciter and its drop-out value is approximately zero volts, the relay 29 will maintain its contacts 31 open and its contacts 32 closed during approximately three-fourths of each cycle of the slip frequency voltage. The relay 29 by opening its contacts 31 interrupts the circuit of the time relay 33. This circuit of the relay 33 also includes auxiliary contacts 39 on the switch 9 and the auxiliary contacts 40 on the switch 18. The relay 33 is designed in any suitable manner so that when it is energized, the contacts 41 which are in series with the contacts 32 of relay 29 are instantly closed and when it is deenergized the contacts are opened after the relay has been deenergized a predetermined time. The time setting of the relay 33 is such that the time it takes the relay to open its contacts 41 is less than the minimum time the contacts 32 of relay 27 are maintained closed during the regulating operation. Therefore, it will be seen that only once during each cycle of the voltage of slip frequency applied to the secondary winding of the machine 3, the contacts 32 and 41 are connected in series for a predetermined time. Each time these contacts 32 and 41 are connected in series a circuit is completed for the brush shifting motor 19 if the desired phase relation does not exist between the primary voltage of the machine 3 and the voltage of the circuit 8. If the primary voltage of the machine 3 leads the voltage of the circuit 8, the contacts 21 and 22 of the phase responsive relay 20 are in engagement so that each time the contacts 32 and 41 are connected in series, a circuit is completed for the control relay 24. Each time the control relay 24 is energized it completes a circuit for the brush shifting motor 19 so that the brushes 14 and 15 are shifted in the proper direction to decrease the lead of the primary voltage of the machine 3. This circuit of the control relay 24 also includes the auxiliary contacts 39 on the switch 9 and the auxiliary contacts 40 on the switch 18.

If the primary voltage of the machine 3 lags the voltage of the circuit 8, the contacts 21 and 23 of the phase responsive relay 20 are in engagement so that each time the contacts 32 and 41 are connected in series a circuit is completed for the control relay 25. Each time this control relay is energized, it completes a circuit for the brush shifting motor 19 so that the brushes 14 and 15 are shifted in the opposite direction to decrease the lag of the primary voltage of the machine 3. The energizing circuit of the control relay 25 also includes the auxiliary contacts 39 on the switch 9 and the auxiliary contacts 40 on the switch 18.

When the desired phase relation between the primary voltage of the machine 3 and the voltage of the circuit 8 is obtained, the switch 9 is closed in any suitable manner to connect the primary winding of the asynchronous machine 3 to the circuit 8 and thereby interconnect the frequency converter 1 between the circuits 4 and 8. By opening its auxiliary contacts 39 the switch 9 removes the brush shifting motor 19 from the control of the phase responsive relay 20. By opening its auxiliary contacts 43, the switch 9 interrupts the circuit of the instantaneous voltage responsive relay 29. The frequency converter 1 is now in a condition to be operated to transfer energy from one of the circuits to the other.

While I have, in accordance with the patent statutes, shown and described my invention as applied to a particular system and as embodying various devices diagrammatically indicated, changes and modifications will be obvious to those skilled in the art and I, therefore, aim in the appended claims to cover all such changes and modifications as fall within the true spirit and scope of my invention.

What I claim as new and desire to secure by Letters Patent of the United States is:

1. In combination, an alternating current circuit, an alternating current dynamo-electric machine having a primary winding connected to said circuit and having a phase wound secondary winding, a source of slip frequency voltage, means including said source for applying a voltage of slip frequency to said secondary winding, means for varying the magnitude of the voltage applied to said secondary winding and means controlled by said voltage for effecting only a single operation of said voltage varying means during each cycle of said voltage.

2. In combination, an alternating current circuit an alternating current dynamo-electric machine having a primary winding connected to said circuit and having a phase wound secondary winding, a source of slip frequency voltage, means including said source for applying a voltage of slip frequency to said secondary winding, means for varying the magnitude of the voltage applied to said secondary winding, and means controlled by said voltage for effecting only a single operation of said voltage varying means for a predetermined time during each cycle of said voltage.

3. In combination, an alternating current circuit an alternating current dynamo-electric machine having a primary winding connected to said circuit and a polyphase secondary winding, means including a polyphase source of slip frequency voltage for energizing said secondary winding, means for varying the excitation of said secondary winding, and control means for said excitation varying means including two half-wave rectifiers connected in series between two phase terminals of said source in such a manner as to prevent the flow of current through said series connection; and a relay having a winding interconnected between the common connection of said rectifiers and a phase terminal of said circuit.

4. In combination, an alternating current circuit an alternating current dynamo-electric machine having a primary winding connected to said circuit and a polyphase secondary winding, means including a three-phase source of slip frequency voltage for energizing said secondary winding, means for varying the excitation of said secondary winding, and control means for said excitation varying means including two half-wave rectifiers connected in series between two phase terminals of said source in such a manner as to prevent the flow of current through said series connection and a relay having a winding interconnected between the other phase terminal of said circuit and the common connection of said rectifiers.

5. In combination, two alternating current circuits, two dynamo-electric machines having their rotors mechanically connected together, each machine having a primary and a secondary winding, means for connecting the primary winding of one of said machines to one of said circuits, means for applying a voltage of slip frequency to the secondary winding of the other machine including an ohmic drop exciter having its rotor mechanically connected to the rotors of said machines, said exciter including a plurality of adjustable brushes, and means for controlling the adjustment of said brushes including two half-wave rectifiers connected in series between two of said brushes and a relay having a winding interconnected between one of said brushes of said exciter and the common connection of said rectifiers.

6. In combination, two alternating current circuits, two dynamo-electric machines having their rotors mechanically connected together, each machine having a primary and a secondary winding, means for connecting the primary winding of one of said machines to one of said circuits, means for applying a voltage of slip frequency to the secondary winding of the other machine including an ohmic drop exciter having its rotor mechanically connected to the rotors of said machines, said exciter including three adjustable brushes, and means for controlling the adjustment of said brushes including two half-wave rectifiers connected in series between two of said brushes and a single phase instantaneous voltage responsive relay having a winding interconnected between the third brush of said exciter and the common connection of said rectifiers.

7. In combination, a three-phase circuit, two half-wave rectifiers connected in series between two phase conductors of said circuit in such a manner as to prevent the flow of current through said series connection, and a single-phase instantaneous voltage responsive relay interconnected between the common connection of said rectifiers and the other phase conductor of said circuit.

HAROLD T. SEELEY.